United States Patent
Tanner et al.

(10) Patent No.: US 6,751,001 B1
(45) Date of Patent: Jun. 15, 2004

(54) NON-SAMPLED AUTO-FORMAT CONVERSION METHOD

(75) Inventors: Allen H. Tanner, Sandy, UT (US); Aaron S. McAllister, Sandy, UT (US)

(73) Assignee: Evans & Sutherland Computer Corporation, Salt Lake City, UT (US)

(*) Notice: Subject to any disclaimer, the term of this patent is extended or adjusted under 35 U.S.C. 154(b) by 3 days.

(21) Appl. No.: 10/350,917

(22) Filed: Jan. 24, 2003

(51) Int. Cl.$^7$ ................................................ G02F 1/01
(52) U.S. Cl. ........................ 359/238; 359/276; 359/278
(58) Field of Search ................................ 359/290, 291, 359/298, 558, 276, 277, 566, 278, 238; 250/208.1, 216

(56) References Cited

U.S. PATENT DOCUMENTS

| | | | |
|---|---|---|---|
| 4,854,669 A | 8/1989 | Birnbach et al. | 359/276 |
| 5,113,455 A | 5/1992 | Scott | 382/298 |
| 5,267,045 A | 11/1993 | Stroomer | 348/441 |
| 5,519,518 A | 5/1996 | Watanabe et al. | 349/57 |
| 5,715,021 A | 2/1998 | Gibeau et al. | 348/750 |
| 5,793,912 A | 8/1998 | Boord et al. | 385/37 |
| 5,860,721 A | 1/1999 | Bowron et al. | 353/101 |
| 5,889,529 A | 3/1999 | Jones et al. | 345/660 |
| 6,154,259 A | 11/2000 | Hargis et al. | 348/756 |
| 6,229,650 B1 | 5/2001 | Reznichenko et al. | 359/566 |
| 6,323,984 B1 | 11/2001 | Trisnadi | 359/245 |
| 6,333,792 B1 | 12/2001 | Kimura | 358/1.2 |
| 6,381,072 B1 | 4/2002 | Burger | 359/622 |
| 6,384,828 B1 | 5/2002 | Arbeiter et al. | 345/472.2 |
| 6,577,429 B1 * | 6/2003 | Kurtz et al. | 359/279 |
| 2002/0101647 A1 * | 8/2002 | Moulin | 359/298 |
| 2003/0035190 A1 * | 2/2003 | Brown et al. | 359/277 |

OTHER PUBLICATIONS

Amm, D.T. and R.W. Corrigan, *Grating Light Valve™ Technology: Update and Novel Applications*, Society for Information Display Symposium, May 19, 1998, Anaheim, CA.

* cited by examiner

Primary Examiner—Jordan M. Schwartz
Assistant Examiner—Jessica Stultz
(74) Attorney, Agent, or Firm—Thorpe North & Western, LLP

(57) ABSTRACT

A device for the passive conversion of one format to another includes: a laser light source at a predetermined frequency, a line converter configured to produce a fan of light, a movable lens configured to collimate the fan of light, and an array of light modulators placed such that the collimated light is incident on a portion of the light modulators. Vertical pixels of an input image are reproduced on either 1, 2, 3, etc, adjacent light modulators depending on the target image size to produce a modulated light column. Any discrepancy between the modulated light column height and the target image height is compensated for using a zoom lens. The modulated light column is then reflected to a display surface. An entire image is produced by changing the state of the array of light modulators to correspond with each of the vertical columns of the image and sweeping the vertical columns across the display surface. The method accomplishes the format conversion passively, in that, simple calculations are performed only once for each input image size. Further, the image produced has no discontinuities or artifacts and results in a dramatically improved picture quality.

13 Claims, 2 Drawing Sheets

NON-SAMPLED AUTO-FORMAT CONVERSION METHOD

BACKGROUND OF THE INVENTION

1. Field of the Invention

The present invention relates generally to conversion and display of image formats.

2. Related Art

Many techniques are used to produce electronic images over various display devices. Electronic images are typically produced by dividing an image into a rectangular array of discrete elements. The number and size of these discrete elements, or pixels, define the image size and resolution to produce various image formats. A wide variety of image formats are used in current electronic equipment. Most display devices are fixed format displays such as CRT monitors, projectors and LCD screens. Image formats such as VGA, SVGA, XGA, SXGA, UXGA and HDTV are common while a multitude of other formats are used in various other displays such as in LCD screens used in portable electronic equipment. Most common display systems are fixed format screens such as UXGA, which is 1600 by 1200 pixels or SXGA, which is 1280 by 1024 pixels. As the number of image formats increases, frequently an input image to such a fixed format screen is different than the available pixels. For example, if a VGA input having 640 horizontal pixels and 480 vertical pixels is displayed on an XGA screen having 1024 horizontal pixels and 768 vertical pixels, 384 horizontal rows and 288 vertical columns of pixels are left unused. The VGA image would only use 60.9% of the entire available XGA screen. The presence of this unused area is undesirable for both efficiency and aesthetic reasons.

Several methods are used in the industry for converting images from one format to another to fully utilize all of the available display area. One simple method is to enlarge each column and row of pixels using various mathematical operations to approximate the pixel values in the final enlarged image. Another approach is to alter the sampling frequency to provide data at the correct pixel spacing using a scan-conversion unit.

Other methods insert blank pixels into an image and then interpolate the value of the blank pixels. The interpolation may be linear and based on the distance that the blank pixel is from the original pixel. Other interpolation methods use various means of interpolating such as using a weighted average of all neighboring pixels or a combination of interpolation schemes based on the surrounding pixels. Such methods may utilize linear, bi-linear or bi-cubic interpolation schemes to resize images. Linear schemes use a weighted average of the two nearest pixels. Bi-linear interpolation schemes use a weighted average of the four nearest pixels to compute the blank pixel. Bi-cubic interpolation schemes use a weighted average of the nearest sixteen pixels, often calculated using a cubic spline. These interpolation schemes require large numbers of calculations and alter the original image resulting in a reduced contrast in the final image. This is particularly problematic with sharp transitions in signals such as with text and high contrast graphics. The enlarged image resulting from most current interpolation schemes is slightly blurred and has a reduced quality at edges within the image.

The current methods of format conversion generally require some measure of continuing calculations to convert an image. These continuing calculations are often significant enough to degrade the image quality, since the time necessary to create the converted image may exceed the frame rate. This results in either a reduced effective frame rate and/or discontinuous jumps in the image over time. The use of more expensive vector displays allow for variable frame rates, but the resulting image will often contain discontinuities and may create a noticeable flicker at longer frame times. Clearly, if the output format is not an integral multiple of the input format the more computationally intensive calculations create undesirable results in the displayed images and increased complexity. Conversion techniques which avoid excessive calculations and preserve the original image quality is therefore a continuing pursuit in the image display industry.

SUMMARY OF THE INVENTION

It has been recognized that it would be advantageous to develop a format conversion method which is passive and eliminates the computational requirements of the prior art.

The present invention provides a passive image format conversion device, which includes: a laser light at a predetermined frequency along a given optical path; a line converter placed in the optical path for converting the laser light to a fan of light; a lens which is moveable with respect to the light source and placed along the optical path within the fan of light and configured to collimate the fan of light; and an array of N light modulators placed in the path of the collimated light column, wherein the moveable lens may be displaced along the optical path to produce a collimated light column of variable image sizes incident on a predetermined portion of the light modulators.

In accordance with a more detailed aspect of the present invention, the system includes an input image signal connected to the array wherein the input image signal has n vertical pixel data over h columns, wherein within each column the n pixel data are modulated on kn light modulators, where n, h and k are positive non-zero integers and kn/N defines the predetermined portion of light modulators and the corresponding variable image size, to produce a modulated light column. In order to produce a two-dimensional image each of the h columns of data may be modulated consecutively over a given time.

In accordance with another more detailed aspect of the present invention, the system includes a movable mirror oriented to reflect the modulated light column toward a projection surface.

In accordance with a yet more detailed aspect of the present invention, the system includes a zoom lens placed along the optical path of the modulated light column after the array and before the projection surface. This zoom lens is adjusted to change the height of the modulated light column to fill the entire vertical pixels of the destination display.

In accordance with another more detailed aspect of the present invention, the line converter is a Powell lens.

In accordance with a more detailed aspect of the present invention, the system includes a laser light source producing a light having a frequency within a range selected from the group consisting of: blue, red and green. The combination of these modulated light frequencies will produce a full color image at a different format than the original.

In accordance with another aspect of the present invention, the laser light sources are pulsed and then combined prior to the line converter. The combined laser light may be a multiplexed light having consecutive intervals of each predetermined frequency.

In accordance with a more detailed aspect of the present invention, each of the N light modulators is a grating light valve device having a primary ribbon and a reference ribbon.

Additional features and advantages of the invention will be apparent from the detailed description which follows, taken in conjunction with the accompanying drawings, which together illustrate, by way of example, features of the invention.

DETAILED DESCRIPTION

Figure 1:
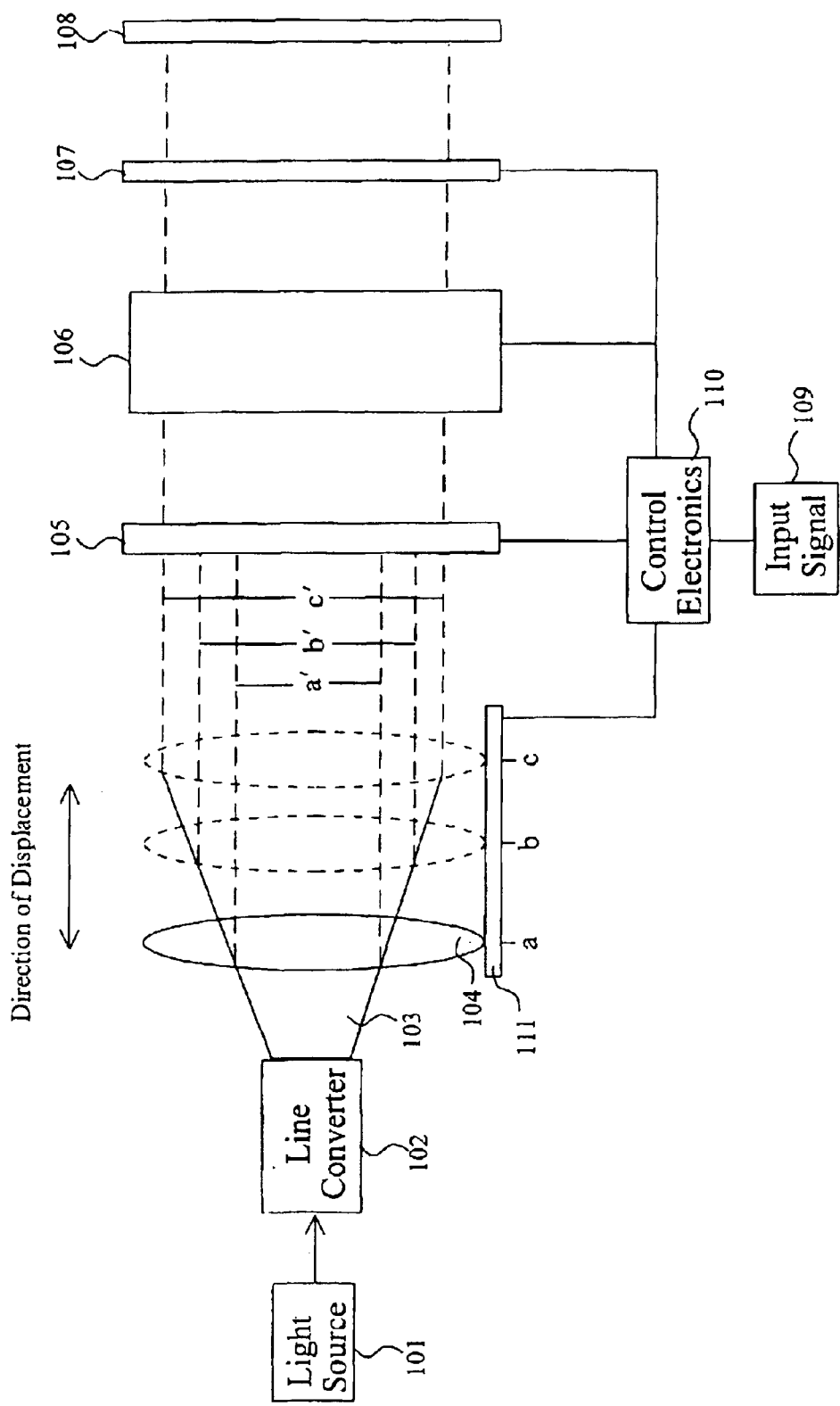
FIG. 1 is a graphic representation of a device in accordance with one embodiment of the present invention showing various lens positions.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present invention.

As used herein, "line converter" is intended to include any device capable of producing a fan of light from a light input source. Examples of such devices include, but are not limited to, Powell lenses, holographic optics, defractive optics, or any other lens systems which spread the light in a fan configuration. Further, such devices need not be limited to producing a fan of light but may also produce a cone.

As used herein, "collimated" light is any light wherein the photons are substantially all traveling parallel. Thus, for example the cross-sectional dimensions of such a collimated beam of light do not change significantly over relatively short distances. This of course may vary slightly depending on the quality and characteristics of the collimated light.

As illustrated in FIG. 1, a system in accordance with the present invention is shown for passively converting one image format to a second image format. A light source 101 is selected to produce a beam of light at a predetermined frequency. This light source may produce a single frequency of light and may be a laser light source such as a diode pumped laser, microlaser, fiber laser, distributed feedback fiber laser, a laser array or any other light source capable of manipulation in accordance with the method of the present invention. Some available light sources may require a filter to remove unwanted modes. The laser light sources of the present invention may be any laser light, however laser light having a high coherency and spatial quality are preferred. In a more detailed aspect, light sources of the present invention may be pulsed or of substantially constant intensity. One exemplary pulsed laser light source for producing full color images is a rapidly oscillating pulsed light having a substantially uniform pulse height over much of the pulse duration. Such a light source is disclosed in U.S. patent application Ser. No. 10/127,987, filed Apr. 22, 2002, entitled Rapidly Oscillating Laser Light Source, which is hereby incorporated by reference in its entirety. Often, the desired frequency is within the blue, green or red frequency ranges for use in visible display systems although other frequencies may be used for various other applications such as for infrared projectors.

In one aspect of the present invention multiple laser light sources are each pulsed at specific intervals. The light sources are then multiplexed using any number of combining technologies such as dichroic prisms, multiplexers, or other color combiners. If a pulsed laser light source mentioned above having a substantially uniform pulse height is used, the light sources are time-multiplexed such that the combined light source exhibits a substantially continuous intensity of light with consecutive segments of varying frequency. For example, if the system includes red, blue and green laser light the pulse frequencies would occur one-third of the pixel time and the pulse lengths would be adjusted accordingly. Such a configuration would produce a combined light having, for example, red, green, and blue segments consecutively repeated in that order, although any pulse order could be arranged.

The beam of light is then directed along an optical path to a line converter 102. The line converter 102 converts the beam of light into a line of radiation. The resulting line forms a fan of light 103 which increases in length with distance from the converter. The line converter of the present invention may be a device such as, but not limited to, Powell lenses, holographic optics, defractive optics, or other lens system which spreads the beam of light in at lease one axis. Thus, although a fan of light is preferred the line converter may also form a cone of light in keeping with the present invention. A Powell lens is particularly suited for the present invention and has the unique characteristic of producing a uniform intensity along the length of the line.

The resulting fan of light 103 is directed toward a collimating lens 104. The collimating lens may be any device or collection of lenses which collimates or focuses the fan of light. The light which is incident on the collimating lens is redirected and collimated as a column of light having a given length. The spread angle of the fan of light and distance between the line converter and the collimating lens determines the length of the column of light. FIG. 1 shows three different positions a, b and c between the line converter and the collimating lens. At position a, the fan of light impinges on a portion of the collimating lens to produce a light column of length a' as shown in FIG. 1. As the collimating lens is moved farther from the line converter the column length increases as shown at position b which corresponds to length b' and position c which corresponds to length c'. Thus, by displacing the lens along the optical path of the beam of light variable beam sizes may be selected.

An advantage of this configuration is that for any displacement distance all of the available light is used thus maintaining a constant image intensity and avoiding waste of available light energy. By utilizing all of the available light energy there is no change in intensity with changes in the input resolution. Thus, this avoids the requirements of power adjustment in optical demagnification systems which is accompanied by increased complexity and energy loss.

The light column is then directed toward an array of N light modulators 105. The light modulators may be any light modulator capable of attenuating or propagating the incident light. Light modulators such as grating light valves, diffraction gratings, spatial light modulators, ferroelectric liquid crystal modulators, deformable mirror devices, or other optical modulators are within the scope of the present invention. Generally, the array will be arranged as a line of N modulators, however if the collimated light has two dimensions a two-dimensional array may be used. The number of modulators in the array is determined by the desired capacity, thus if one desires the ability to convert any commonly available format they would currently need at least 1280 modulators in the array. The array of light modulators is oriented to receive the entire light column which may be produced. Further, each light modulator, or group of modulators, is individually controllable and is capable of modulating the incident light independently of the other N−1 light modulators. The drive current to each modulator, or group of modulators, is varied based on the received signal. The ability to individually address each modulator requires some modification of the GLV modulators using built in control electronics. Although individually addressing the light modulators is not essential to the present invention it reduces the number of light modulators required for a given display as well as the cost and size of the final product.

Although various light modulators could be used in the present invention, GLV modulators are of particular interest. A GLV is a micro-electromechanical device having thin ribbons with a reflective coating on one side, usually aluminum. Upon application of a given voltage the ribbons will deflect due to electrostatic forces. Light incident upon the ribbons is therefore diffracted based on the position of the ribbons. By rapidly changing the applied voltage the incident light may be modulated over time in a precisely controlled manner. By adjusting the ribbon deflections between zero and a quarter wavelength the modulated light intensity in the zero and first orders can precisely controlled. One commercially available GLV array includes 1088 addressable pixels, i.e. 2176 individual ribbons each pixel consisting of a reference ribbon and a movable ribbon. By varying the applied voltage to the movable ribbon one can control the intensity of the modulated light. This allows for further manipulation of the column of light to correct for any non-uniformities in the final image.

Referring again to FIG. 1, an input signal 109 is sent to control electronics 110 where the number of horizontal and vertical pixels is identified. The input image having n vertical pixels and h horizontal pixels is delivered to the array one column at a time. The method and system of the present invention may also be applied using rows of the image instead of the columns to illuminate the array and is merely a matter of design choice. The number of vertical pixels determines the number of active modulators needed for the format conversion process of the present invention. A target format size is fixed by the particular embodiment of the device and is generally, N vertical pixels and H horizontal pixels. The n vertical pixels of the original image arc duplicated on k adjacent modulators, where k is defined as an integer satisfying the expression $N \geq kn$. Preferably, k is the largest integer which satisfies the aforementioned expression, although smaller values would also work. The control electronics 110 having synchronization logic therein then sends the data for each vertical pixel to k adjacent pixels in the array in the same sequence as the original image.

For example, if the input image is VGA (n=480 and h=640) and the target format is SXGA (N=1280 and H=1024) then k would equal 2. Thus, in this example, there are 960 active modulators in the array which require input information. Each of the 480 data of the original image is then modulated on two adjacent modulators to produce a modulated column of light. In another example, a GLV array having 4096 addressable ribbons would have 4096 additional reference ribbons and N would be 4096. Further, if n=1200 then k values of 2 and 3 would be possible. A k value of 2 would require the use of 2400 pairs of ribbons, whereas a k value of 3 would utilize 3600 pairs of ribbons. The k value of 3 will reduce the degree of magnification required from the zoom lens 106 and is discussed in more detail below. Notice that the column of light is thus actually a column of individually modulated beams of light at various frequencies. The active modulators must therefore have light incident from the collimating lens.

Control electronics 110 is programmed to provide the appropriate position for the movable collimating lens 104 along track 111 based on the required number of active modulators. The portion of the array which requires incident light is kn/N. This value is correlated to a lens position that will produce a light column which will impinge on the required kn modulators and the collimating lens 104 is displaced along the optical path accordingly. In one embodiment of the present invention, the active modulators are the upper kn modulators.

The active modulators maintain their positions for a specific modulation time which corresponds to the appropriate pixel time or portion thereof. Thus, for a system which includes red, green and blue light sources which are multiplexed as discussed above, the array 105 of modulators would hold a separate state for each of the frequency segments and one cycle of red, green and blue interval segments would cover information for a single column of pixels in the original image. In this way, each of the frequency segments may be modulated individually to produce the desired target image.

In accordance with another aspect of the present invention, the modulated light column is then directed to a zoom lens 106. Recall that the active pixels do not always correspond to the entire available target N pixels. This is only the case when kn=N. Thus, a zoom lens is used to adjust the image height to compensate for the N−kn/N unused vertical pixels in the target format. Thus, if k is chosen to be the largest integer which satisfies the expression $N \geq kn$, then the zoom lens is required to compensate for a smaller height difference. Again, control electronics 110 delivers the information necessary to adjust the zoom lens to the desired final height. The zoom lens acts as a variation of magnification to fully utilize the entire available vertical projection height. The zoom lens arrangement generally contains at least three optical elements, two of which are moveable, and provides variation of the focal length without changing the sharpness of the image over comparatively large distances. Although two or more lenses could be used to produce a zoom lens, using two lenses is simpler but also restricts the range over which sharpness may be maintained. Further, the unused vertical pixels should not exceed half the available pixels in the array. First, such a configuration would not satisfy the restrictions on k. Second, using the zoom lens to compensate for over half the vertical height would introduce a noticeable loss of sharpness and clarity.

In order to produce a full two-dimensional image the array of modulators must modulate each of the h columns over a given period of time. The synchronization logic of control electronics 110 ensures that the input signals are delivered to each modulator at the correct time. The modulated columns are consecutively reflected toward a projection surface 108 using a movable mirror 107 such that the sweep time corresponds to the horizontal size of the image. Alternatively, once the light column is modulated and adjusted, the light is projected onto the display surface using projection optics 121. The projection surface and optics may be any known to those in the art.

The method of the present invention may be applied to projectors, back-projection displays, monitors or other display devices. Those skilled in the art will readily recognize various display configurations and applications for the present invention. For example, for a HDTV target format of 1280 horizontal and 720 vertical pixels, the first column would be modulated on array 105. The amount of time the array of modulators remains in a particular state determines the pixel time and the number of pixels in the horizontal sweep direction. The rate of movement of the mirror must correspond to the pixel time. The synchronization of the changes in state of the array with the mirror rate of motion is controlled via a timing circuit. The pixel time for an input having pixels and target H horizontal pixels will be H/h times as long as if the format had H pixels. Unlike the vertical format conversion the horizontal conversion may be any multiple of the input format since time is a continuous function, therefore H/Ah need not be an integer. The target horizontal image size is determined by the maximum angular displacement of the movable mirror. The movable mirror may sweep horizontally from left to right repeatedly, sweep from left to right and back again, or the method of the present invention could be designed to sweep across the vertical axis of the image. Further, many mirror configurations are possible such as using a rotating mirror, polygonal mirror or other reflecting device. In addition, those skilled in the art will recognize that although the embodiment described herein is shown as a vertical array sweeping across columns the invention may be performed by modulating rows of information and sweeping vertically across rows to produce the image.

The method of the present invention further produces an image which is essentially continuous in both the vertical and horizontal dimensions. Thus, although the vertical image has discrete components, the resulting image is a continuous analog image having no visible discontinuities. This has the desirable effect of eliminating the appearance of lines or boundaries in the final image. In addition, features within the image will display no artificial artifacts as these features move around the image. This advantage of the present invention has application in areas such as flight simulation. Common technologies produce artifacts in the image which are more noticeable than a natural image. Thus, the elimination of such artifacts allows for dramatically improved and more realistic simulations. The method of the present invention results in an image having no discrete pixel components and the original image resolution is not modified, but merely resizes the image to correspond with the target image size. Another way to view the effect of the present invention is that the zoom lens and movable lens configuration are adjusted according to the principles discussed herein in order to maintain a constant image size regardless of the input image format.

In another more detailed aspect of the present invention, following the modulation of the light column at array 105, the modulated light column may be passed through a filter to eliminate unwanted sidebands or frequencies. Any number of filters could be used such as, but is not limited to, Schlieren stops, stops, apertures or any device which would prevent unwanted frequencies from passing the filter. Further, the filter may be placed anywhere along the optical path after the array and preferably between the array and the zoom lens.

Although the lens arrangements have been described using particular configurations those skilled in the art will recognize that the description of various individual lenses is not limiting and each may be replaced by a compound lens or reflective optical element. It will also be apparent that the spatial arrangements necessary for various diffraction grating and/or modulator elements are possible and various specific configurations may be had in keeping with the method of the present invention.

Figure 2:
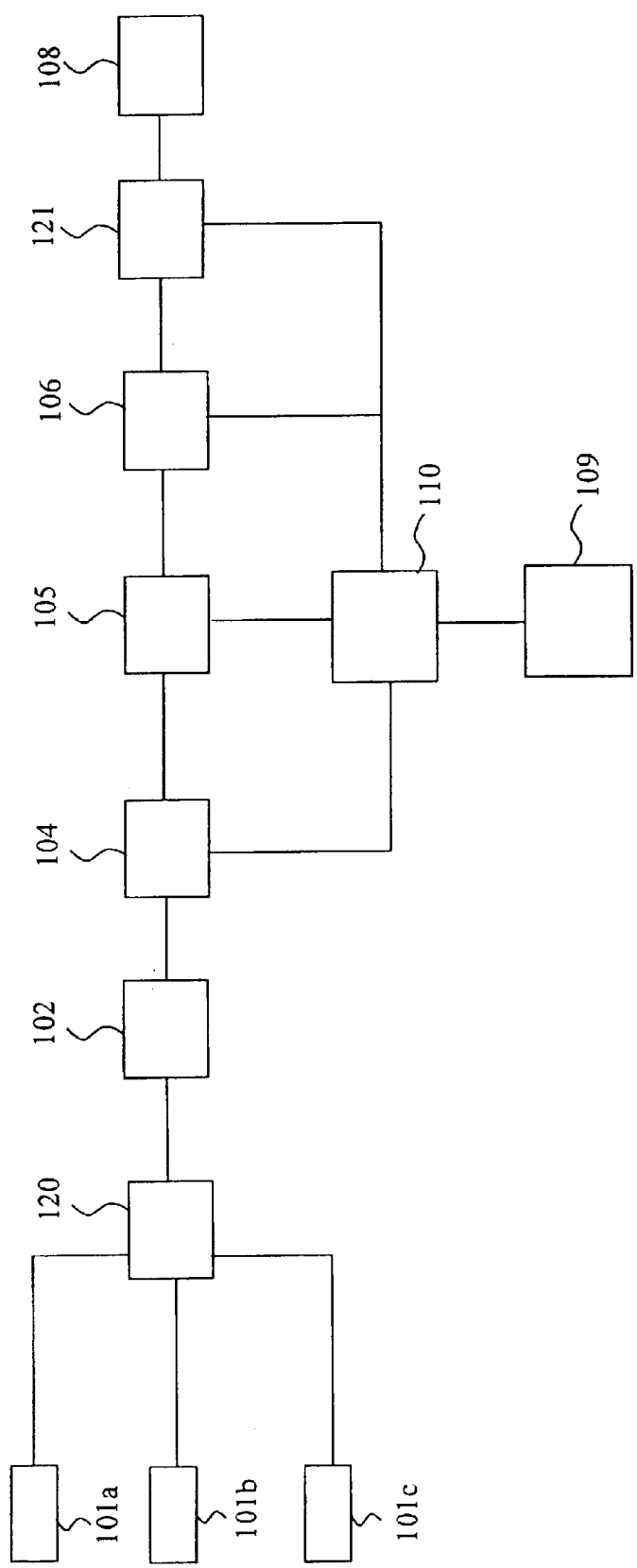
FIG. 2 is a schematic diagram of one embodiment of the present invention utilizing three light sources to produce a full-color image.

In a more detailed aspect of the present invention, a full-color image is produced using combined high quality light sources of red, blue and green. FIG. 2 shows three laser light sources of red 101*a*, green 101*b* and blue 101*c*. Each of the light sources may be continuous or pulsed at intervals of one-third of the pixel-time. The laser light sources may be any laser light, however laser light having a high coherency and spatial quality are preferred. The three light sources are then multiplexed at combiner 120 using any number of combining technologies such as dichroic prisms, multiplexers, or other color combiners. If a pulsed laser light source mentioned above having a substantially uniform pulse height is used, the combined light source exhibits a substantially continuous intensity of light with consecutive segments of varying frequency. The multiplexed light can then be delivered to the line converter 102 and collimating lens 104 and the red, green and blue components of the image are then modulated on the array of light modulators 105, column-by-column as described above. The modulators of array 105 are further controlled by the synchronization logic of control electronics 110, which ensures that the input signals are delivered to each modulator at the correct time. The synchronization logic also controls the movable mirror 107 (shown in FIG. 1) to ensure that the sweep time corresponds to the horizontal size of the image. The difference here would be that the preprocessor and synchronization logic 110 must deliver the signals for each of the three color components of each input pixel at the appropriate time to the light modulators. In this aspect of the present invention the input image is separated into red, green and blue components.

Notice that in this embodiment the zoom lens and movable mirror may be placed before or after any color combiner and either arrangement would be within the scope of the present invention. The modulated columns of light may then be combined using various projection optics known to those skilled in the art. This modulated column of light may then be adjusted in height to compensate for the unused portion of the target format and reflected to the projection surface. Once the light column is modulated and adjusted, the light is projected onto the display surface using projection optics 121. Although, each color could be modulated separately in accordance with the present invention, the above arrangement would reduce the expense of the projection system by requiring only one zoom lens and movable mirror set instead of three.

In another aspect of the present invention, the laser light sources produce a laser light having a substantially constant intensity and are non-pulsed. In this aspect of the present invention, each frequency of laser light will be modulated individually. Thus, each laser light source would at least include a line converter, moveable lens and array of modulators which would operate according to the principles outlines above.

An advantage of the present invention is that simple integer calculations are necessarily performed once for each new input format. This has significant benefits over other methods which require complex calculations be performed continuously as the image data changes. The method of the present invention utilizes the quantity of pixels to perform the passive conversion rather than the actual pixel values. Also note that the method of the present invention is applied only to converting a format having fewer vertical pixels than the target format. Further, the present invention displays all of the input information without alteration thus maintaining the original image quality.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiment(s) of the invention. It will be apparent to those of ordinary skill in the art that numerous modifications can be made without departing from the principles and concepts of the invention as set forth in the claims.

What is claimed is:

1. A passive image format conversion device, comprising:
   a) a laser light source configured to produce an energy beam at a predetermined frequency along a given optical path;
   b) a line converter placed in the optical path for converting the energy beam to a fan of light;
   c) a lens moveable with respect to the light source and placed along the optical path within the fan of light subsequent to the line converter and configured to collimate the fan of light to produce a collimated light column; and
   d) an array of N light modulators placed in the path of the collimated light column, wherein the moveable lens may be displaced along the optical path to produce a collimated light column of variable image sizes incident on a predetermined portion of the light modulators.

2. A device in accordance with claim 1, further comprising an input image signal operatively connected to the array wherein the input image signal has n vertical pixel data over h columns, wherein within each column the n pixel data are modulated on kn light modulators, where n, h and k are positive non-zero integers and kn/N defines the predetermined portion of light modulators and the corresponding variable image size, to produce a modulated light column which is directed toward a projection surface.

3. A device in accordance with claim 2, further comprising a movable mirror oriented to reflect the modulated light column toward the projection surface and wherein each of the h columns of data are modulated consecutively over a given time.

4. A device in accordance with claim 2 or 3, further comprising a zoom lens placed along the optical path of the modulated light column after the array and before the projection surface.

5. A device in accordance with claim 4, further comprising a Schlieren stop placed in the optical path of the modulated light column before the zoom lens.

6. A device in accordance with claim 1, wherein the line converter is a Powell lens.

7. A device in accordance with claim 1, wherein the laser light source produces a light having a frequency within a range selected from the group consisting of blue, red and green.

8. A device in accordance with claim 1, wherein the laser light source produces a light having a frequency within the infrared range.

9. A device in accordance with claim 1, wherein each of the N light modulators is a grating light valve device having a primary ribbon and a reference ribbon.

10. A device in accordance with claim 9, wherein N is greater than 480.

11. A method for passive up-conversion of an image, comprising the steps of:
    a) providing laser light source configured to produce laser light having a predetermined frequency;
    b) producing a fan of light from the laser light;
    c) providing a lens at variable distances from the laser light source, wherein the variable distance is chosen to select a variable image size to produce a collimated light column of a predetermined size;
    d) providing a first digital image wherein each vertical pixel is modulated on an integral number of adjacent light modulators placed in a linear array;
    e) directing the column of light onto the array of light modulators, wherein the column size is incident on an integer multiple number of the light modulators to produce a modulated column of light;
    f) using a zoom lens to adjust the column height of the modulated light column to correspond to a second digital image vertical height; and
    g) directing the modulated light column onto a display surface.

12. A method in accordance with claim 11, wherein the step of directing further comprises using a movable mirror to direct the modulated light column and moving the mirror at a rate configured to sweep across a second digital image width of columns to produce a two dimensional image.

13. A method in accordance with claim 12, wherein the step of providing a laser light source further comprises:
    a) providing red, blue and green pulsed laser light sources wherein each laser light source is pulsed at a predetermined frequency; and
    b) combining the red, blue and green pulsed laser light sources such that the resulting laser light has consecutive intervals of each color.

* * * * *